(12) United States Patent
Maruo et al.

(10) Patent No.: US 12,334,541 B2
(45) Date of Patent: Jun. 17, 2025

(54) DEVICE FOR MANUFACTURING ELECTRODE PLATE AND METHOD FOR MANUFACTURING ELECTRODE PLATE

(71) Applicants: Panasonic Holdings Corporation, Osaka (JP); TOYOTA JIDOSHA KABUSHIKI KAISHA, Aichi-ken (JP)

(72) Inventors: Tetsumasa Maruo, Hyogo (JP); Tomofumi Hirukawa, Toyota (JP)

(73) Assignees: Panasonic Holdings Corporation, Osaka (JP); TOYOTA JIDOSHA KABUSHIKI KAISHA, Aichi (JP)

(*) Notice: Subject to any disclaimer, the term of this patent is extended or adjusted under 35 U.S.C. 154(b) by 147 days.

(21) Appl. No.: 17/915,777

(22) PCT Filed: Mar. 25, 2021

(86) PCT No.: PCT/JP2021/012559
§ 371 (c)(1),
(2) Date: Sep. 29, 2022

(87) PCT Pub. No.: WO2021/200546
PCT Pub. Date: Oct. 7, 2021

(65) Prior Publication Data
US 2023/0223513 A1  Jul. 13, 2023

(30) Foreign Application Priority Data
Mar. 30, 2020 (JP) .................... 2020-059675

(51) Int. Cl.
*H01M 4/04* (2006.01)
*B30B 3/00* (2006.01)
(Continued)

(52) U.S. Cl.
CPC ............... *H01M 4/139* (2013.01); *B30B 3/00* (2013.01); *B65H 23/18* (2013.01); *H01M 4/04* (2013.01)

(58) Field of Classification Search
CPC ....................................................... H01M 4/04
See application file for complete search history.

(56) References Cited

U.S. PATENT DOCUMENTS

2022/0140308 A1* 5/2022 Nishida ................ H01M 4/131
429/223

FOREIGN PATENT DOCUMENTS

JP  2002-184394 A  6/2002
JP  2005-093236 A  4/2005
(Continued)

OTHER PUBLICATIONS

Machine translation of document N.*
(Continued)

*Primary Examiner* — Austin Murata
(74) *Attorney, Agent, or Firm* — Rimon P.C.

(57) ABSTRACT

A manufacturing apparatus for an electrode plate includes: a conveyance line of the electrode plate having an applied portion in which an electrode active material is applied to a surface of a base material and a non-applied portion in which the electrode active material is not applied to the surface of the base material; a compression roll provided in the conveyance line and compressing the applied portion; and a tension reducing mechanism provided in at least one of an upstream section ending at the compression roll or a downstream section starting at the compression roll in the conveyance line and reducing a tension applied to the electrode plate.

5 Claims, 4 Drawing Sheets

(51) Int. Cl.
    *B65H 23/18*    (2006.01)
    *H01M 4/139*    (2010.01)

(56) References Cited

FOREIGN PATENT DOCUMENTS

| | | | |
|---|---|---|---|
| JP | 2017-228349 A | | 12/2017 |
| JP | 2018-063660 A | | 4/2018 |
| JP | 2018/063860 | * | 4/2018 |

OTHER PUBLICATIONS

International Search Report issued in corresponding International Application No. PCT/JP2021/012559, dated May 25, 2021, with English translation.

* cited by examiner

DEVICE FOR MANUFACTURING ELECTRODE PLATE AND METHOD FOR MANUFACTURING ELECTRODE PLATE

CROSS-REFERENCE TO RELATED APPLICATIONS

This application is the U.S. National Phase under 35 U.S.C. § 371 of International Patent Application No. PCT/JP2021/012559, filed on Mar. 25, 2021, which in turn claims the benefit of Japanese Patent Application No. 2020-059675, filed on Mar. 30, 2020, the entire content of each of which is incorporated herein by reference.

BACKGROUND

Field of the Invention

The present disclosure relates to a manufacturing apparatus for an electrode plate and a manufacturing method for an electrode plate.

Description of the Related Art

In general, an electrode plate used for a lithium ion secondary battery or the like has a structure in which an electrode active material is applied to a surface of a base material (current collector) made of an aluminum foil, a copper foil, or the like. Further, the electrode plate has a non-applied portion where the electrode active material is not applied to the surface of the base material. The non-applied portion functions as, for example, a current collecting tab. That is, the electrode plate has the applied portion in which the base material and the electrode active material layer are stacked, and the non-applied portion made only of the base material.

As a manufacturing method for the electrode plate, a method is known in which an electrode active material is continuously applied to a center portion in a width direction of a long base material while the base material is conveyed, thereby forming a long electrode plate having an applied portion extending in a conveyance direction at the center portion of the base material and a non-applied portion extending in the conveyance direction at an end of the base material. In addition, for the purpose of increasing a density of the electrode active material, causing a thickness to be uniform, and the like, it is known to compress the applied portion of the electrode plate by roll pressing or the like. Normally, the electrode plate after compressing the applied portion is wound into a roll form and transferred to a next step. In a downstream step, the electrode plate is divided into a plurality of pieces, stacked with a separator interposed therebetween, and enclosed in an exterior can.

When the applied portion is compressed, it is ideal that only the electrode active material is compressed and the base material constituting the applied portion is not rolled. However, in actuality, when the applied portion is compressed, the base material is also rolled. On the other hand, since the thickness of the non-applied portion is smaller than the thickness of the applied portion, the base material constituting the non-applied portion is not rolled when the applied portion is compressed. As a result, a difference occurs between the length of the applied portion and the length of the non-applied portion. If such variations in length occur, wrinkles are generated in the electrode plate, which may hinder conveyance or winding of the electrode plate.

On the other hand, for example, Patent Literature 1 discloses a method in which an active material coated sheet having a strip-shaped coated portion at a center portion of a metal foil and having a strip-shaped uncoated portion at an end edge of the metal foil is passed between pressure rolls to form a long sheet electrode, a strain between the coated portion and the uncoated portion is relaxed by applying a tension to the long sheet electrode while heating the uncoated portion, and after the strain is relaxed, the long sheet electrode is cut and divided into sheet electrodes.
Patent Literature 1: JP 2005-93236 A As a result of intensive studies on the above-described conventional method, the present inventors have found that, when a treatment for eliminating variations in the length between the applied portion and the non-applied portion is provided in a conveyance line, there is an increased possibility that the electrode plate is broken at the time of compression of the applied portion.

SUMMARY OF THE INVENTION

The present disclosure has been made in view of such a situation, and an object thereof is to provide technology for more stably manufacturing an electrode plate.

One aspect of the present disclosure is a manufacturing apparatus for an electrode plate. This apparatus includes: a conveyance line of the electrode plate having an applied portion in which an electrode active material is applied to a surface of a base material and a non-applied portion in which the electrode active material is not applied to the surface of the base material; a compression roll provided in the conveyance line and compressing the applied portion; and a tension reducing mechanism provided in at least one of an upstream section ending at the compression roll or a downstream section starting at the compression roll in the conveyance line and reducing a tension applied to the electrode plate.

Another aspect of the present disclosure is a manufacturing method for an electrode plate. This method includes: conveying the electrode plate having an applied portion in which an electrode active material is applied to a surface of a base material and a non-applied portion in which the electrode active material is not applied to the surface of the base material; compressing the applied portion of the conveyed electrode plate; and reducing a tension applied to the electrode plate in at least one of an upstream section ending at a compression position or a downstream section starting at the compression position.

Arbitrary combinations of the above components and conversions of an expression of the present disclosure between a method, a device, a system, and the like are also effective as aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
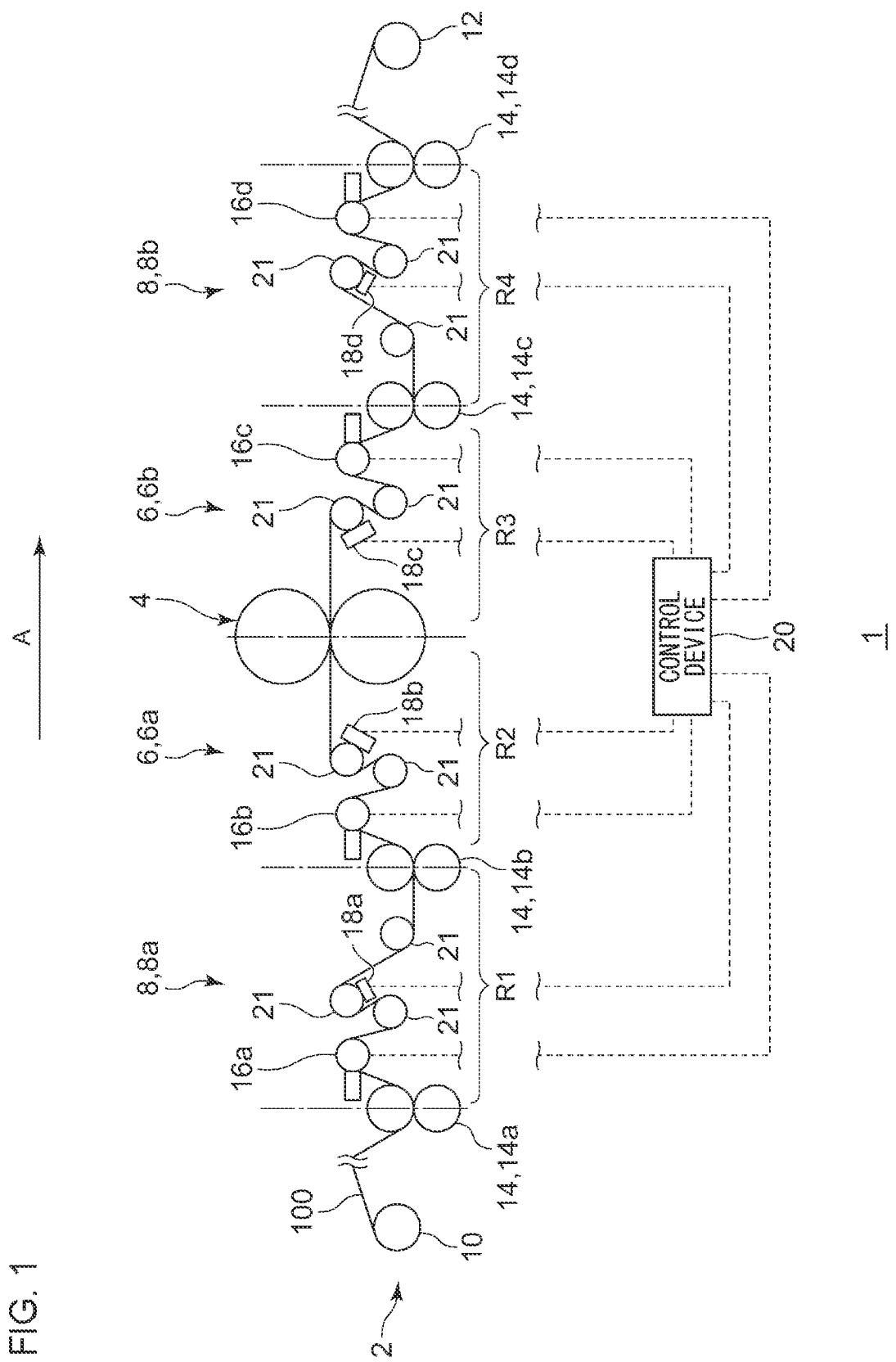
FIG. 1 is a side view schematically illustrating a manufacturing apparatus for an electrode plate according to an embodiment.

Hereinafter, the present disclosure will be described on the basis of preferred embodiments while referring to the drawings. The embodiments do not limit the present disclosure, but are exemplary, and all features and combinations thereof described in the embodiments are not necessarily essential to the present disclosure. The same or equivalent components, members, and processes illustrated in the drawings will be denoted by the same reference numerals, and repeated description will be omitted as appropriate.

In addition, the scale or shape of each component illustrated in the drawings is set for the sake of convenience to facilitate the explanation and is not to be analyzed as limitative unless otherwise specified. In addition, when the terms "first", "second", and the like are used in the present specification or claims, such terms do not represent any order or degree of importance and are used to distinguish one configuration from another configuration, unless otherwise specified. In addition, in each drawing, some of members that are not important for describing the embodiment are omitted.

Figure 2A:
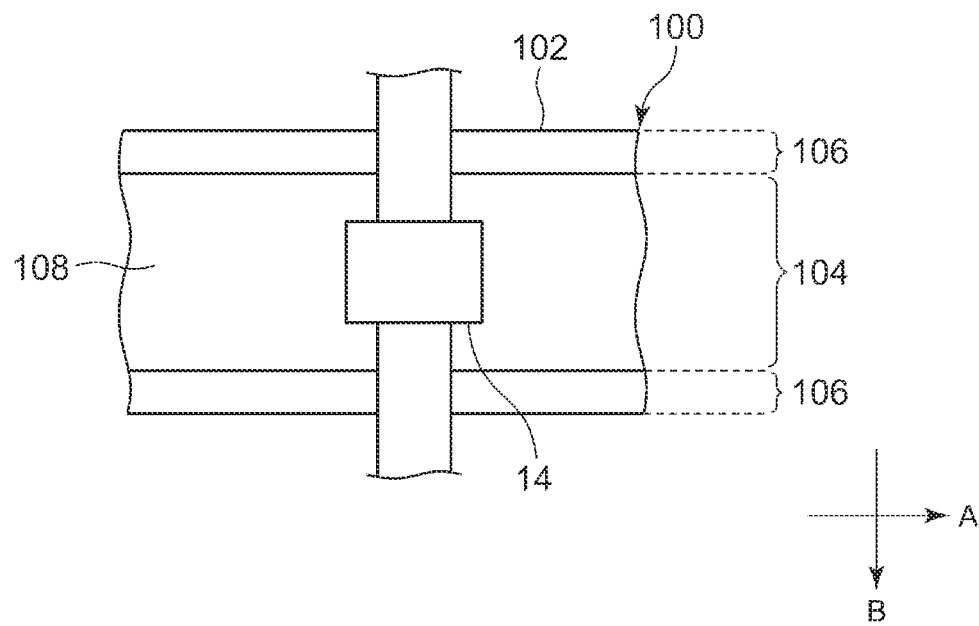
FIG. 2A is a plan view schematically illustrating a state in which a conveyance mechanism conveys the electrode plate.
Figure 2B:
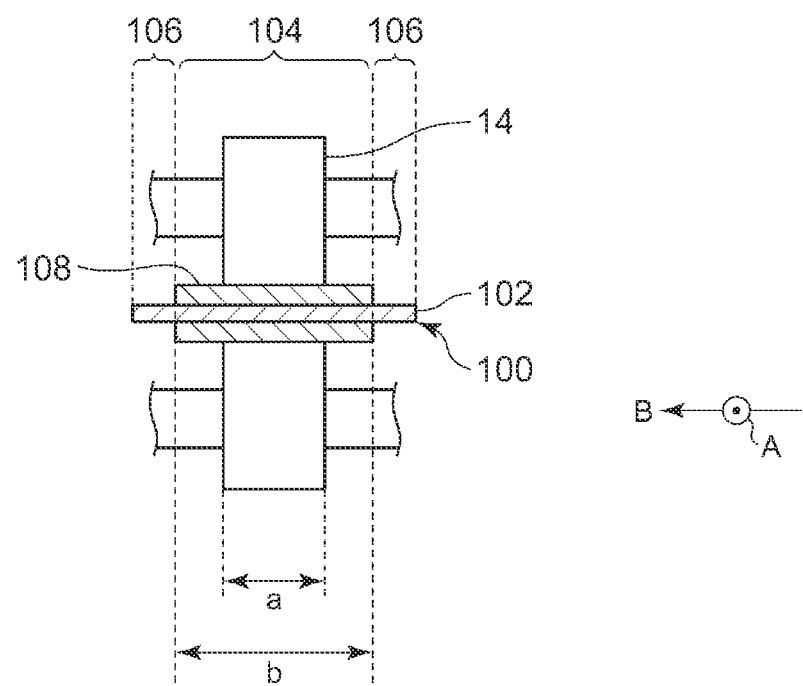
FIG. 2B is a cross-sectional view schematically illustrating a state in which the conveyance mechanism conveys the electrode plate.

FIG. 1 is a side view schematically illustrating a manufacturing apparatus for an electrode plate according to an embodiment. FIG. 2A is a plan view schematically illustrating a state in which a conveyance mechanism conveys an electrode plate. FIG. 2B is a cross-sectional view schematically illustrating a state in which the conveyance mechanism conveys the electrode plate.

A manufacturing apparatus 1 for an electrode plate includes a conveyance line 2, a compression roll 4, a tension reducing mechanism 6, and a stretching mechanism 8. In the manufacturing apparatus 1 of the present embodiment, the tension reducing mechanism 6 and the stretching mechanism 8 are provided on both the upstream side and the downstream side of the compression roll 4 in the conveyance line 2. Hereinafter, the tension reducing mechanism 6 on the upstream side is referred to as a first tension reducing mechanism 6a, and the tension reducing mechanism 6 on the downstream side is referred to as a second tension reducing mechanism 6b. When the first tension reducing mechanism 6a and the second tension reducing mechanism 6b do not need to be distinguished from each other, they are collectively referred to as the tension reducing mechanism 6. Similarly, the stretching mechanism 8 on the upstream side is referred to as a first stretching mechanism 8a, and the stretching mechanism 8 on the downstream side is referred to as a second stretching mechanism 8b. When the two stretching mechanisms do not need to be distinguished from each other, they are collectively referred to as the stretching mechanism 8.

The conveyance line 2 is a mechanism that conveys an electrode plate 100. The electrode plate 100 has an applied portion 104 in which an electrode active material is applied to a surface of a long base material 102, and a non-applied portion 106 in which the electrode active material is not applied to the surface of the base material 102. The base material 102 functions as a current collector. When the electrode plate 100 is a negative electrode plate of a lithium ion secondary battery, the base material 102 is formed of, for example, a foil or a porous body made of copper, aluminum, or the like. When the electrode plate 100 is a positive electrode plate of the lithium ion secondary battery, the base material 102 is formed of, for example, a foil or a porous body made of stainless steel, aluminum, or the like.

When the electrode plate 100 is the negative electrode plate of the lithium ion secondary battery, the electrode active material is graphite or the like. When the electrode plate 100 is the positive electrode plate of the lithium ion secondary battery, the electrode active material is lithium cobalt oxide, lithium iron phosphate, or the like. The electrode active material is applied to the base material 102 in a state of electrode mixture slurry in which, for example, a conductive assistant, a binder, a dispersant, and the like are mixed. After the electrode mixture slurry is applied, a coating film is dried and rolled to form electrode active material layers 108. In the present embodiment, the electrode active material layers 108 are provided on both surfaces of the base material 102. The applied portion 104 has a structure in which the base material 102 and the electrode active material layer 108 are stacked. On the other hand, the non-applied portion 106 includes only the base material 102.

The conveyance line 2 has an unwinding device 10, a winding device 12, and a conveyance mechanism 14. The unwinding device 10 is disposed at a start point of the conveyance line 2. The unwinding device 10 holds the electrode plate 100 not subjected to the compression treatment of the applied portion 104 in a state of a wound body, for example, and sends the electrode plate to the downstream side of the conveyance line 2. The winding device 12 is disposed at an end point of the conveyance line 2. The winding device 12 collects the electrode plate 100 subjected to the compression treatment of the applied portion 104 in a state of a wound body, for example.

The conveyance mechanism 14 is disposed between the unwinding device 10 and the winding device 12 on the conveyance line 2, and conveys the electrode plate 100 from the unwinding device 10 toward the winding device 12. The conveyance mechanism 14 of the present embodiment includes a first conveyance mechanism 14a, a second conveyance mechanism 14b, a third conveyance mechanism 14c, and a fourth conveyance mechanism 14d. The first conveyance mechanism 14a to the fourth conveyance mechanism 14d are disposed at predetermined intervals in this order from the upstream side in a conveyance direction A of the electrode plate 100. Hereinafter, when it is not necessary to distinguish the first conveyance mechanism 14a to the fourth conveyance mechanism 14d, they are collectively referred to as the conveyance mechanism 14. Note that the number of conveyance mechanisms 14 is not limited to four.

The conveyance mechanism 14 of the present embodiment includes nip rolls that grip and convey the electrode plate 100. The conveyance mechanism 14 grips the applied portion 104 and conveys the electrode plate 100. Therefore, the conveyance mechanism 14 does not abut on the non-applied portion 106. As a result, it is possible to suppress generation of wrinkles in the non-applied portion 106 at the time of conveying the electrode plate 100 in a state in which the non-applied portion 106 is stretched more than the applied portion 104 by the stretching mechanism 8 to be described later. Therefore, the structure in which the conveyance mechanism 14 grips only the applied portion 104 is preferably particularly adopted for the second conveyance mechanism 14b that determines a downstream end of the first stretching mechanism 8a.

As illustrated in FIG. 2B, the conveyance mechanism 14 is designed to satisfy a/b≥0.4, when a dimension in a width direction B of a portion gripped by the conveyance mechanism 14 in the applied portion 104 is set to a, and a dimension in the width direction B of the applied portion 104 is set to b. The width direction B is a direction orthogonal to the conveyance direction A of the electrode plate 100.

Figure 3:
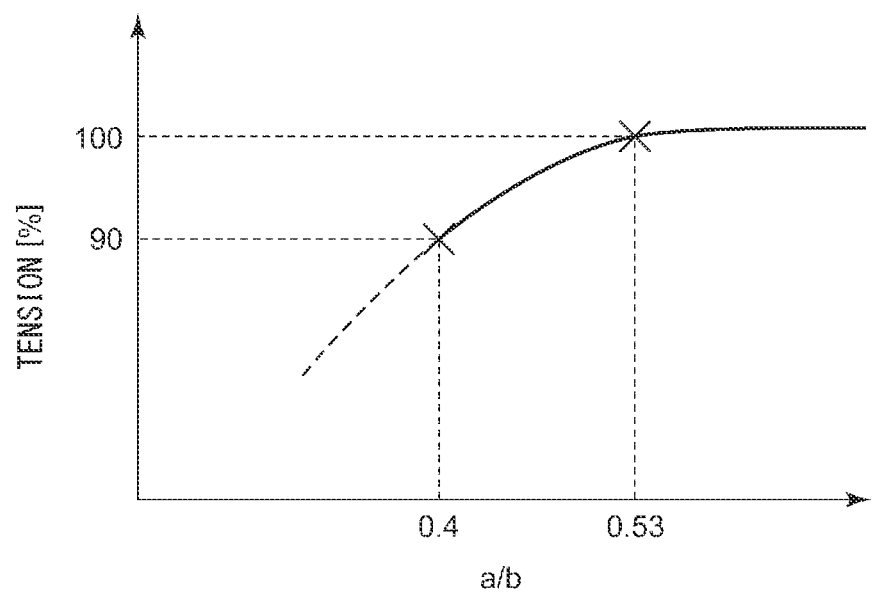
FIG. 3 is a diagram illustrating a relation between a dimension ratio a/b and a tension applied to the electrode plate.

FIG. 3 is a diagram illustrating a relation between a dimension ratio a/b and a tension applied to the electrode plate 100. The "tension" on a vertical axis is a ratio of a tension obtained at each a/b to the tension obtained when the conveyance mechanism 14 grips the entire width of the applied portion 104 (that is, a/b is 1). As illustrated in FIG. 3, when a/b is 0.4, a tension of 90% of the tension obtained when a/b is 1 can be obtained. Therefore, by designing the conveyance mechanism 14 such that a/b is 0.4 or more, it is possible to more reliably suppress a decrease in the conveyance speed of the electrode plate 100 while suppressing generation of wrinkles in the non-applied portion 106. In addition, a/b is preferably 0.53 or more.

Note that the conveyance mechanism 14 may be structured to suck and convey the electrode plate 100. For example, the conveyance mechanism 14 includes a suction roll or the like. In this case, the dimension a is a dimension in the width direction B of a portion of the applied portion 104 sucked by the conveyance mechanism 14. The conveyance mechanism 14 may have a plurality of nip rolls or suction rolls arranged in the width direction B. In this case, the sum of dimensions of portions gripped or sucked by the rolls is the dimension a.

The compression roll 4 is provided between the second conveyance mechanism 14b and the third conveyance mechanism 14c in the conveyance line 2. The compression roll 4 includes a pair of rolls disposed at a predetermined interval. The applied portion 104 can be pressurized in the thickness direction of the electrode plate 100 by passing the electrode plate 100 between the pair of rolls. As a result, the applied portion 104 is compressed.

The electrode plate 100 is also conveyed by the rotation of the compression roll 4. Therefore, the compression roll 4 also functions as a nip roll. A tension adjuster is provided in a section between the nip rolls (that is, the conveyance mechanism 14 and the compression roll 4), and the tension applied to the electrode plate 100 being conveyed on the conveyance line 2 is independently adjusted in each section. The tension adjuster of the present embodiment includes a dancer roll.

Specifically, a first tension adjuster 16a is provided in a first section R1 between the first conveyance mechanism 14a and the second conveyance mechanism 14b. A second tension adjuster 16b is provided in a second section R2 between the second conveyance mechanism 14b and the compression roll 4. A third tension adjuster 16c is provided in a third section R3 between the compression roll 4 and the third conveyance mechanism 14c. A fourth tension adjuster 16d is provided in a fourth section R4 between the third conveyance mechanism 14c and the fourth conveyance mechanism 14d.

In the first section R1, a first tension measurement device 18a that measures the tension applied to the electrode plate 100 by the first tension adjuster 16a is provided. In the second section R2, a second tension measurement device 18b that measures the tension applied to the electrode plate 100 by the second tension adjuster 16b is provided. In the third section R3, a third tension measurement device 18c that measures the tension applied to the electrode plate 100 by the third tension adjuster 16c is provided. In the fourth section R4, a fourth tension measurement device 18d that measures the tension applied to the electrode plate 100 by the fourth tension adjuster 16d is provided. Examples of the first tension measurement device 18a to the fourth tension measurement device 18d include known contact type tensiometers, tension pick-up rolls, and the like.

The operations of the compression roll 4, the conveyance mechanism 14, the first tension adjuster 16a to the fourth tension adjuster 16d, and the like are controlled by a control device 20. The control device 20 is realized by an element or a circuit such as a CPU or a memory of a computer as a hardware configuration, and is realized by a computer program or the like as a software configuration. However, the control device 20 is illustrated as a functional block realized by cooperation between them in FIG. 1. It should be understood by those skilled in the art that the functional blocks can be implemented in various forms by a combination of hardware and software.

The control device 20 receives tension data from the first tension measurement device 18a to the fourth tension measurement device 18d, and controls driving of the first tension adjuster 16a to the fourth tension adjuster 16d on the basis of the received tension data. As a result, the tension applied to the electrode plate 100 in the first section R1 to the fourth section R4 can be adjusted to a desired value. Note that the control device 20 can also control the operation of each part on the basis of a preset fixed operation program instead of feedback control based on the measurement results of the first tension measurement device 18a to the fourth tension measurement device 18d.

The first tension reducing mechanism 6a is provided on the upstream side of the compression roll 4 in the conveyance line 2. The first tension reducing mechanism 6a is disposed in the second section R2 and reduces the tension applied to the electrode plate 100 in the second section R2. That is, the first tension reducing mechanism 6a is disposed in an upstream section ending at the compression roll 4 in the conveyance line 2. The first tension reducing mechanism 6a includes a second tension adjuster 16b, a second tension measurement device 18b, a guide roll 21, a control device 20, and the like. The control device 20 drives the second tension adjuster 16b on the basis of the measurement result of the second tension measurement device 18b, so that the tension applied to the electrode plate 100 in the second section R2 is reduced more than the tension applied to the electrode plate 100 in the first section R1. For example, the tension applied to the electrode plate 100 in the second section R2 is adjusted to 0.

Further, the second tension reducing mechanism 6b is provided on the downstream side of the compression roll 4. The second tension reducing mechanism 6b is disposed in the third section R3 and reduces the tension applied to the electrode plate 100 in the third section R3. That is, the second tension reducing mechanism 6b is disposed in a downstream section starting at the compression roll 4. The second tension reducing mechanism 6b includes a third tension adjuster 16c, a third tension measurement device 18c, a guide roll 21, a control device 20, and the like. The control device 20 drives the third tension adjuster 16c on the basis of the measurement result of the third tension measurement device 18c, so that the tension applied to the electrode plate 100 in the third section R3 is reduced more than the tension applied to the electrode plate 100 in the fourth section R4. For example, the tension applied to the electrode plate 100 in the third section R3 is adjusted to 0.

The stretching mechanism 8 is provided at a position farther from the compression roll 4 than the tension reducing mechanism 6 in the conveyance line 2 and stretches the non-applied portion 106. In the present embodiment, the first stretching mechanism 8a is provided in the first section R1 on the upstream side of the first tension reducing mechanism 6a, and the second stretching mechanism 8b is provided in the fourth section R4 on the downstream side of the second tension reducing mechanism 6b. The first stretching mechanism 8a includes a first tension adjuster 16a, a first tension measurement device 18a, a guide roll 21, a control device 20, and the like. The second stretching mechanism 8b includes a fourth tension adjuster 16d, a fourth tension measurement device 18d, a guide roll 21, a control device 20, and the like.

Figure 4:
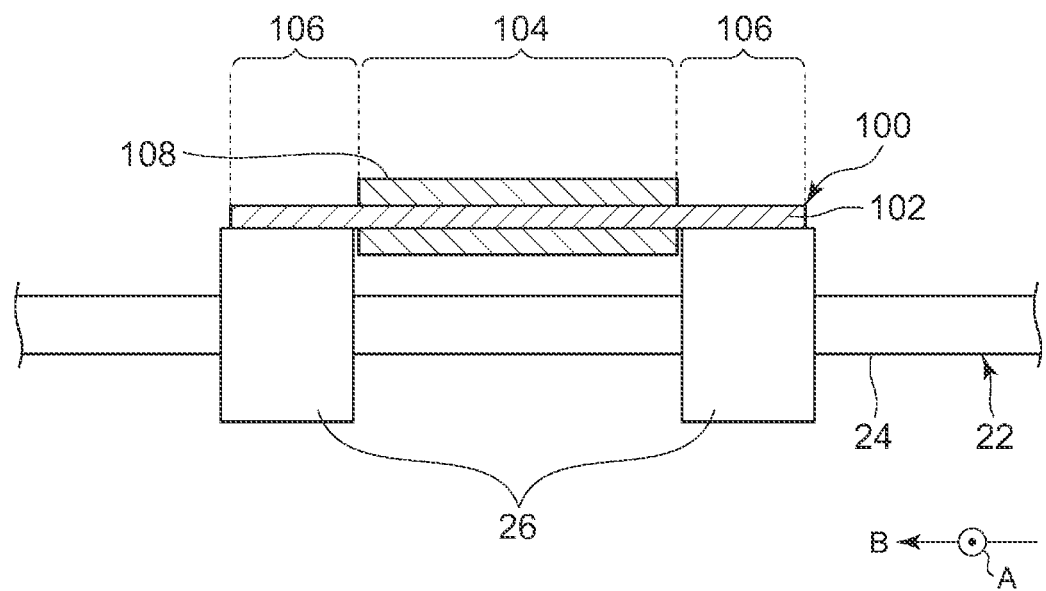
FIG. 4 is a schematic view of a non-applied portion stretching roll included in a stretching mechanism.

The stretching mechanism 8 has a non-applied portion stretching roll 22 illustrated in FIG. 4. FIG. 4 is a schematic view of the non-applied portion stretching roll 22 included in the stretching mechanism 8. The non-applied portion stretching roll 22 has a rotating shaft 24 and a support portion 26. The rotating shaft 24 rotates as the electrode plate 100 is conveyed. The support portion 26 is provided on the outer periphery of the rotating shaft 24, and rotates together with the rotating shaft 24 while supporting the electrode plate 100. The support portion 26 has a step and abuts only on the non-applied portion 106 of the electrode plate 100. The applied portion 104 is separated from the non-applied portion stretching roll 22. When the tension is applied to the electrode plate 100 by the first tension adjuster 16a or the fourth tension adjuster 16d in this state, the non-applied portion 106 is pressed by the support portion 26 and stretched. On the other hand, since the applied portion 104 is not pressed by the support portion 26, the stretching amount is smaller than that of the non-applied portion 106.

In the first stretching mechanism 8a, the dancer roll constituting the first tension adjuster 16a or the guide roll 21 is constituted by the non-applied portion stretching roll 22. Similarly, in the second stretching mechanism 8b, the dancer roll constituting the fourth tension adjuster 16d or the guide roll 21 is constituted by the non-applied portion stretching roll 22. From the viewpoint of maintaining the measurement accuracy of the tension, it is preferable that the guide roll 21 (roll with a load cell) on which the first tension measurement device 18a or the fourth tension measurement device 18d is installed is not used as the non-applied portion stretching roll 22.

As a result of intensive studies, the present inventors have found that, when the applied portion 104 is compressed by the compression roll 4 in a state where the tension is applied to the electrode plate 100, the base material 102 constituting the applied portion 104 may be excessively stretched and broken. In particular, in recent years, due to a request for improving the energy density of a battery, the application amount of the electrode mixture slurry tends to increase, and the thickness of the electrode active material layer 108 tends to increase. When the thickness of the electrode active material layer 108 increases, a larger force is applied to the base material 102 when the applied portion 104 is compressed by the compression roll 4, and the base material 102 is further stretched.

On the other hand, by disposing the tension reducing mechanism 6 between each stretching mechanism 8 and the compression roll 4, it is possible to suppress the tension applied to the electrode plate 100 in each stretching mechanism 8 from being transmitted to the portion of the electrode plate 100 sandwiched by the compression roll 4. As a result, the tension applied to the portion of the electrode plate 100 sandwiched by the compression roll 4 can be reduced, and the base material 102 can be suppressed from being excessively stretched and broken.

In the present embodiment, the tension reducing mechanism 6 is provided on both the upstream side and the downstream side of the compression roll 4. However, the present disclosure is not limited thereto, and if the tension reducing mechanism 6 is provided on at least one of the upstream side or the downstream side of the compression roll 4, the stretching of the base material 102 can be suppressed as compared with a case where the tension reducing mechanism 6 is provided on neither the upstream side nor the downstream side.

Figure 5:
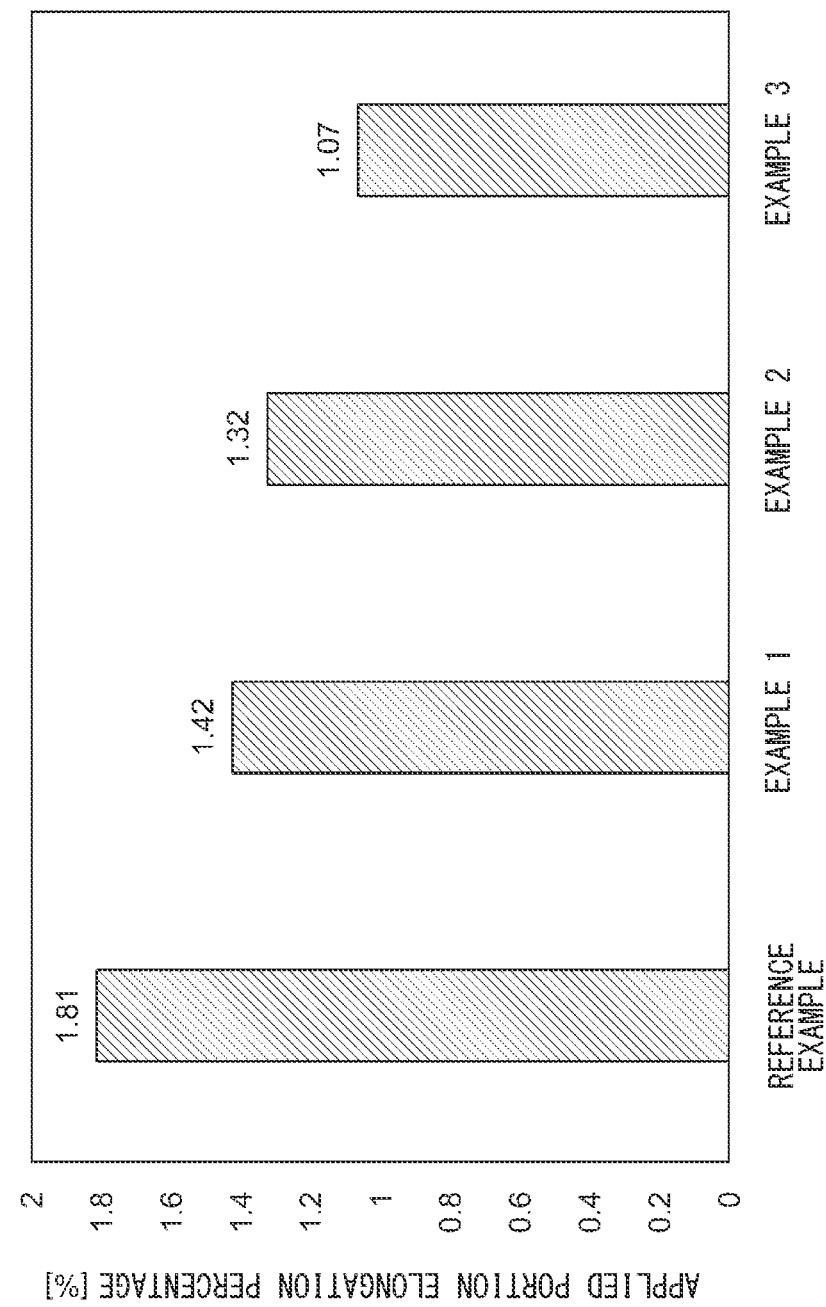
FIG. 5 is a diagram illustrating a relation between the presence or absence of a first tension reducing mechanism and a second tension reducing mechanism and an elongation percentage of an applied portion.

FIG. 5 is a diagram illustrating a relation between the presence or absence of the first tension reducing mechanism 6a and the second tension reducing mechanism 6b and an elongation percentage of the applied portion 104. A reference example is a manufacturing apparatus including neither the first tension reducing mechanism 6a nor the second tension reducing mechanism 6b. An example 1 is a manufacturing apparatus including only the second tension reducing mechanism 6b. That is, this is an example in which the tension caused by the first stretching mechanism 8a is transmitted to the electrode plate 100 from the upstream side of the compression roll 4. An example 2 is a manufacturing apparatus including only the first tension reducing mechanism 6a. That is, this is an example in which the tension caused by the second stretching mechanism 8b is transmitted to the electrode plate 100 from the downstream side of the compression roll 4.

A third example is a manufacturing apparatus including the first tension reducing mechanism 6a and the second tension reducing mechanism 6b. That is, this is an example in which the tension caused by the stretching mechanism 8 is not transmitted to the electrode plate 100 from both the upstream side and the downstream side of the compression roll 4. The manufacturing apparatus of each of the reference example and the examples includes the first stretching mechanism 8a and the second stretching mechanism 8b. The "applied portion elongation percentage" on a vertical axis is a ratio of the length of the applied portion 104 compressed by each manufacturing apparatus to the length of the uncompressed applied portion 104. The elongation percentage of the applied portion 104 was obtained by marking lines on the applied portion 104 and the non-applied portion 106, and measuring the lengths between the lines before and after compression with a metal foot measure or an enlarged microscope.

As illustrated in FIG. 5, in the manufacturing apparatus according to each of the examples 1 to 3, the elongation percentage of the applied portion 104 was reduced as compared with the manufacturing apparatus of the reference example. From this, it was confirmed that, when the tension reducing mechanism 6 is provided on at least one of the upstream side or the downstream side of the compression roll 4, stretching of the applied portion 104 can be suppressed, and breakage of the electrode plate 100 can be suppressed as a result. From the results of the examples 1 and 2, it was confirmed that, when the tension reducing mechanism 6 is provided only on any one of the upstream side and the downstream side of the compression roll 4, the breakage of the electrode plate 100 can be further suppressed by providing the tension reducing mechanism 6 on the upstream side.

From the result of the example 3, it was confirmed that, when the tension reducing mechanism 6 is provided on both the upstream side and the downstream side of the compression roll 4, the stretching of the applied portion 104 can be most suppressed, and the breakage of the electrode plate 100 can be most suppressed as a result. Note that, even in a case where the stretching mechanism 8 is not provided in the conveyance line 2, not a little tension is applied to the electrode plate 100 when the electrode plate 100 is conveyed. Therefore, even in a case where the stretching mechanism 8 is not provided, the effect of suppressing the breakage of the electrode plate 100 by the tension reducing mechanism 6 can be obtained.

As described above, the manufacturing apparatus 1 of the electrode plate 100 according to the present embodiment includes the conveyance line 2 that conveys the electrode plate 100 having the applied portion 104 and the non-applied portion 106, the compression roll 4 that is provided in the conveyance line 2 and compresses the applied portion 104, and the tension reducing mechanism 6 that is provided in at least one of the upstream section (the second section R2) ending at the compression roll 4 or the downstream section (the third section R3) starting at the compression roll 4 in the conveyance line 2 and reduces the tension applied to the electrode plate 100. By providing the tension reducing section in at least one of the section extending to the upstream side from the compression roll 4 or the section extending to the downstream side from the compression roll 4, it is possible to suppress stretching of the base material 102 when the applied portion 104 is compressed by the compression roll 4. As a result, it is possible to reduce the risk of breakage of the electrode plate and to more stably manufacture the electrode plate 100.

The tension reducing mechanism 6 of the present embodiment is provided in both the upstream section and the downstream section of the compression roll 4. As a result, it is possible to further suppress stretching of the base material 102. Therefore, the electrode plate 100 can be more stably manufactured.

Further, the manufacturing apparatus 1 of the present embodiment includes the stretching mechanism 8 that stretches the non-applied portion 106 at a position farther from the compression roll 4 than the tension reducing mechanism 6 in the conveyance line 2. As a result, it is possible to reduce variations between the length of the applied portion 104 and the length of the non-applied portion 106, and to suppress generation of wrinkles in the electrode plate 100. Therefore, the electrode plate 100 can be more stably manufactured.

The stretching mechanism 8 of the present embodiment is provided on both the upstream side and the downstream side of the compression roll 4. Therefore, the non-applied portion 106 can be stretched in two stages. As a result, it is possible to suppress the occurrence of strain in the electrode plate 100 and an increase in load applied to the electrode plate 100 due to the stretching treatment of the non-applied portion 106. Therefore, the electrode plate 100 can be more stably manufactured.

The conveyance line 2 of the present embodiment includes the conveyance mechanism 14 that grips or sucks the applied portion 104 and conveys the electrode plate 100. As a result, it is possible to suppress generation of wrinkles in the non-applied portion 106 and to more stably manufacture the electrode plate 100.

In addition, the manufacturing apparatus 1 of the present embodiment satisfies a/b≥0.4, when a dimension of the portion gripped or sucked by the conveyance mechanism 14 in the applied portion 104 in the width direction B orthogonal to the conveyance direction A of the electrode plate 100 is set to a, and a dimension of the applied portion 104 in the width direction B is set to b. As a result, it is possible to suppress a decrease in the conveyance speed of the electrode plate 100 while suppressing generation of wrinkles in the non-applied portion 106.

The embodiments of the present disclosure have been described above in detail. The above-described embodiments are merely specific examples for carrying out the present disclosure. The contents of the embodiments do not limit the technical scope of the present disclosure, and many design changes such as changes, additions, and deletions of components can be made without departing from the spirit of the present disclosure defined in the claims. A new embodiment to which the design change is made has the effect of the combined embodiment and modifications. In the above-described embodiments, the contents that can be changed in design are emphasized with notations such as "of the present embodiment" and "in the present embodiment", but the design change is allowed even in the contents without such notations. Any combination of the components included in each embodiment is also effective as an aspect of the present disclosure. The hatching applied to the cross sections of the drawings does not limit the material of the hatched target.

The invention according to the above-described embodiment may be specified by an item described below.

Item 1

A manufacturing method for an electrode plate (100) includes:
  conveying the electrode plate (100) having an applied portion (104) in which an electrode active material is applied to a surface of a base material (102) and a non-applied portion (106) in which the electrode active material is not applied to the surface of the base material (102);
  compressing the applied portion (104) of the conveyed electrode plate (100); and
  reducing a tension applied to the electrode plate (100) in at least one of an upstream section ending at a compression position or a downstream section starting at the compression position.

The invention claimed is:
1. A manufacturing apparatus for an electrode plate, comprising:
  a conveyance line of the electrode plate having an applied portion in which an electrode active material is applied to a surface of a base material and a non-applied portion in which the electrode active material is not applied to the surface;
  a compression roll provided in the conveyance line and structured to compress the applied portion; and
  a tension reducing mechanism provided in at least one of an upstream section ending at the compression roll or a downstream section starting at the compression roll in the conveyance line and structured to reduce a tension applied to the electrode plate,
  wherein the manufacturing apparatus further comprises:
    a stretching mechanism structured to stretch the non-applied portion at a position farther from the compression roll than the tension reducing mechanism in the conveyance line by applying, to the non-applied portion, a tension larger than the tension applied to the electrode plate in a section in which the tension is reduced by the tension reducing mechanism, wherein the conveyance line includes an unwinding device that sends the electrode plate not subjected by the compression roll to a compression treatment of the applied portion to a downstream side of the conveyance line and includes a winding device that collects the electrode plate subjected to the compression treatment, and wherein the tension reducing mechanism and the stretching mechanism are disposed at least in one of a section between the unwinding device and the compression roll or a section between the compression roll and the winding device.

2. The manufacturing apparatus according to claim 1, wherein the tension reducing mechanism is provided in both the upstream section and the downstream section.

3. The manufacturing apparatus according to claim 1, wherein the stretching mechanism is provided on both an upstream side and a downstream side of the compression roll.

4. The manufacturing apparatus according to claim 1, wherein the conveyance line has a conveyance mechanism that grips or sucks the applied portion and conveys the electrode plate.

5. The manufacturing apparatus according to claim 4, wherein when a dimension of a portion gripped or sucked by the conveyance mechanism in the applied portion in a width direction orthogonal to a conveyance direction of the electrode plate is set to a, and a dimension of the applied portion in the width direction is set to b, $a/b \geq 0.4$ is satisfied.

* * * * *